United States Patent [19]

Tynan

[11] Patent Number: 4,556,324

[45] Date of Patent: Dec. 3, 1985

[54] APPARATUS FOR FORMING FILMS OF CONSTANT THICKNESS

[75] Inventor: Daniel G. Tynan, Wilmington, Del.

[73] Assignee: E. I. Du Pont de Nemours and Company, Wilmington, Del.

[21] Appl. No.: 605,806

[22] Filed: May 1, 1984

[51] Int. Cl.⁴ .............................................. B29B 1/10
[52] U.S. Cl. ...................................... 366/85; 366/90; 366/301
[58] Field of Search ....................... 366/83, 84, 85, 90, 366/97, 300, 301; 425/204

[56] References Cited

U.S. PATENT DOCUMENTS

| | | | |
|---|---|---|---|
| 529,837 | 11/1894 | Quimby . | |
| 2,502,563 | 4/1950 | Goodchild | 366/301 |
| 3,734,468 | 5/1973 | Cheng et al. | 366/300 |
| 3,927,869 | 12/1975 | Hanslik | 425/204 |
| 4,040,607 | 8/1977 | Ullrich | 366/85 |
| 4,131,371 | 12/1978 | Tynan | 366/301 |
| 4,343,929 | 8/1982 | Sugio et al. | 366/85 |
| 4,352,568 | 10/1982 | Löhr et al. | 366/84 |
| 4,406,601 | 9/1983 | Towner . | |

Primary Examiner—Robert W. Jenkins
Assistant Examiner—Arthur D. Dahlberg

[57] ABSTRACT

Counter-rotating intermeshing rotors are employed to generate films of viscous material to enhance processing. The rotors are configured that they trap viscous material in open-ended chambers defined by the rotor surfaces. As rotation proceeds the chambers decrease in volume and the material is expelled through the ends of the chambers as a film. Longitudinally adjacent rotors each have a different angular orientation about their centers of rotation to provide a sawtooth stepped helix to convey material longitudinally.

3 Claims, 13 Drawing Figures

APPARATUS FOR FORMING FILMS OF CONSTANT THICKNESS

BACKGROUND OF THE INVENTION

This invention relates to processing fluids, more particularly it relates to the processing of very viscous polymers in a processor having counter-rotating intermeshing rotors employed to generate thin films.

In the manufacture or processing of viscous material, such as polymers and other high viscosity substances, it is frequently advantageous to subject the material to reaction, heating, devolatilizing, intimate mixing, melt plasticating and the like and sometimes to conduct one or more of these operations simultaneously or consecutively in a single apparatus. One such apparatus is disclosed in U.S. Pat. No. 4,131,371 where the material is repetitively spread and collected to provide more surface area for reaction to take place as it progresses through the apparatus. However as viscosity on the material increases, surface renewal becomes more difficult and less efficient with the prior art apparatus.

SUMMARY OF THE INVENTION

This invention overcomes the problems of the prior art in handling highly viscous materials and comprises a material processor embodying a multiplicity of intermeshed or coacting counter rotating rotors. The rotors are configured to provide a clearance between the closest point of the rotors to each other during rotation. During rotation the peripheral surface of intermeshing rotors defines open-ended chambers which diminish in volume as rotation proceeds forcing material trapped in the chamber out through the ends of the chamber as a film. Further rotation traps the film in a newly formed chamber. Longitudinally adjacent rotors each have different angular orientation about their axis of rotation to provide a sawtooth stepped helix to convey the material longitudinally while the material is formed into a film and recombined in a newly formed chamber.

DETAILED DESCRIPTION OF THE ILLUSTRATED EMBODIMENT

Figure 1:
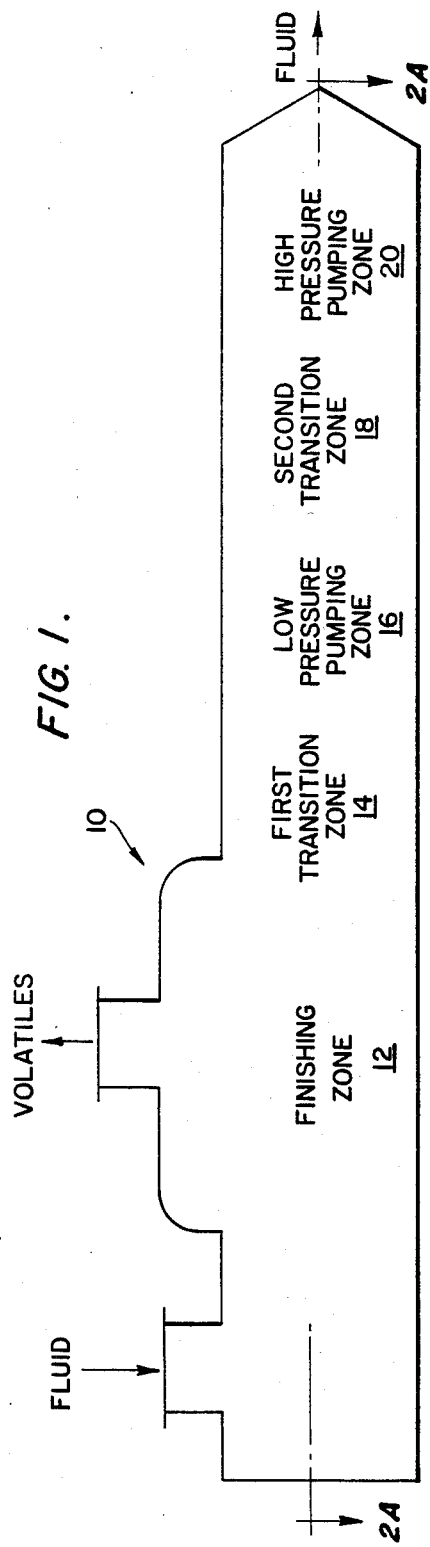
FIG. 1 is a schematic elevation of a material processor incorporating this invention.
Figure 2A:
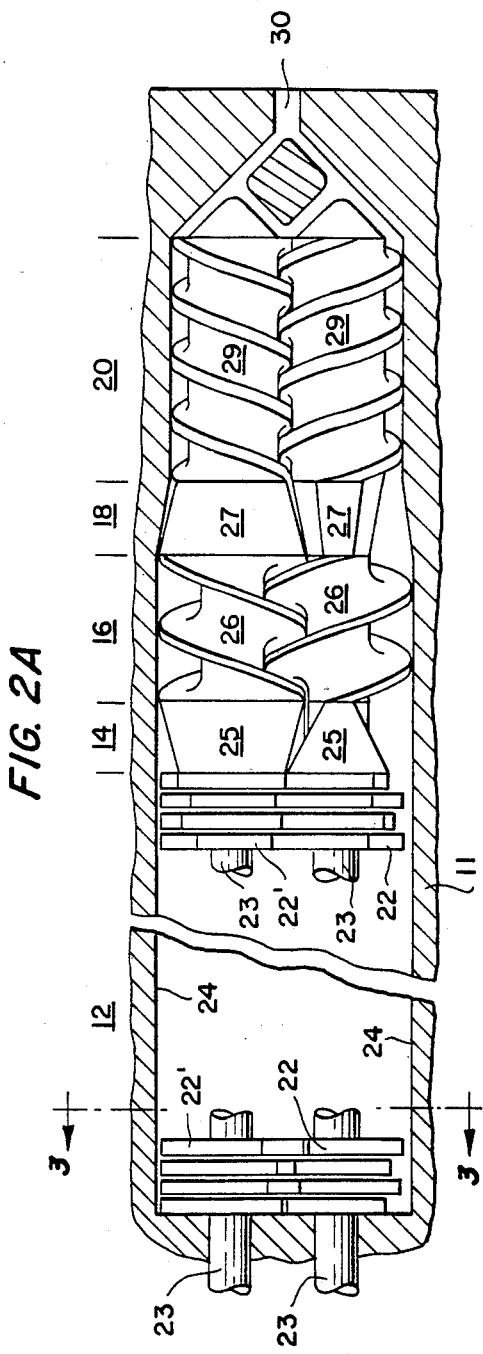
FIG. 2A is a sectioned view of FIG. 1 taken along the line 2A—2A showing a plan view of the intermeshing rotors of this invention.
Figure 2B:
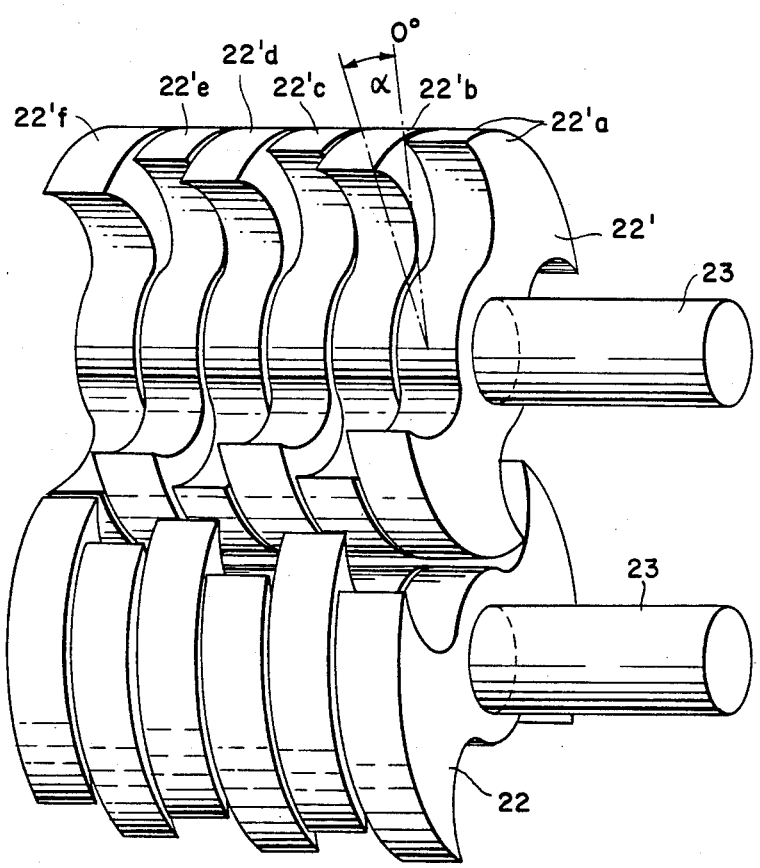
FIG. 2B is a perspective view of the intermeshing rotors in the finishing zone of FIG. 2A.

Referring now to FIGS. 1, 2A and 2B, the apparatus in which this invention may be advantageously used is a continuous melt polymerizer 10 for processing very viscous (nonflowable) polycondensates, e.g., a paste which will flow little, if at all, under the influence of gravity, where polymerization is diffusion limited. The polymerizer 10 generally includes a finishing zone 12, a first transition zone 14, a low pressure pumping zone 16, a second transition zone 18, and a high pressure pumping zone 20. The rotors designated 22, 22' in the finishing zone 12 are counter-rotating intermeshing rotors on twin parallel shafts 23 located within the cylindrical bores 24 of housing 11 which provide a high order of mixing and which generate films of fluid, to enhance volatile extraction, regardless of the rheology of the fluid being processed. Continuing along each of the shafts 23 the rotors 22, 22' are followed by transition rotor elements 25. These are helical screws which change in shape in the axial direction. The transition rotors 25 transfer fluid from the upstream finishing zone 12 to the low pressure pumping zone 16 with its screws 26 which have fairly deep channels so that fluid will flow freely from the finishing zone (which has a weak pumping action) via the first transition zone 14 into this set of pumping screws 26. The fluid is then pumped by screws 26 through a second transition zone 18 (housing transition elements 27) into a high pressure pumping zone 20 housing pumping screws 29. Screws 29 have shallow screw channels and are able to generate high pressure to expel the fluid from the polymerizer through its outlet 30 for transport to a further step in the process.

The rotors 22, 22' in the finishing zone 12 are configured on the rotor shafts 23 as to transport the fluid in an axial direction while simultaneously generating fluid surface and mixing fluid. The desired axial movement results from configuring the rotor sections 22, 22' in gradual "sawtooth" helices as best shown in FIG. 2B. Each rotor in succession is placed on shafts 23 either at a positive angle or negative angle from the adjacent one and wherein the positive angle exceeds the absolute value of the negative angle. The following table and FIG. 2B illustrate such positioning of the rotors for plus 15 angular degrees and minus 12 angular degrees.

| Rotor | α (degrees) |
| --- | --- |
| 22' a | 0 |
| 22' b | 15 |
| 22' c | 3 |
| 22' d | 18 |
| 22' e | 6 |
| 22' f | 21 |

Other configurations also work; for example plus 15 degrees, minus 10 degrees performs acceptably well.

Figure 3:
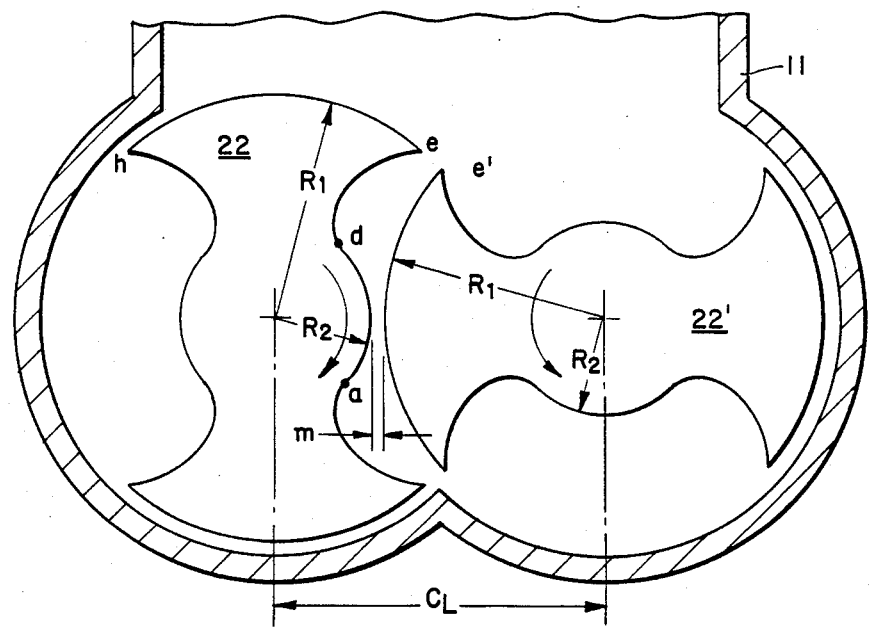
FIG. 3 is a sectioned view of FIG. 2 taken along line 3—3 showing an elevation view of the intermeshing rotors of this invention.
Figure 4A:
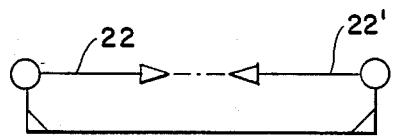
FIGS. 4A—4D are schematic illustrations of the formation of a portion of the peripheral surface configuratin of one embodiment of the rotors of this invention.
Figure 4B:
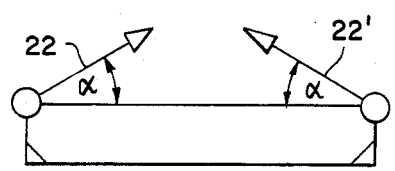
Figure 4C:
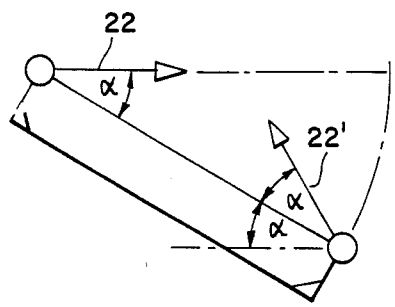
Figure 4D:
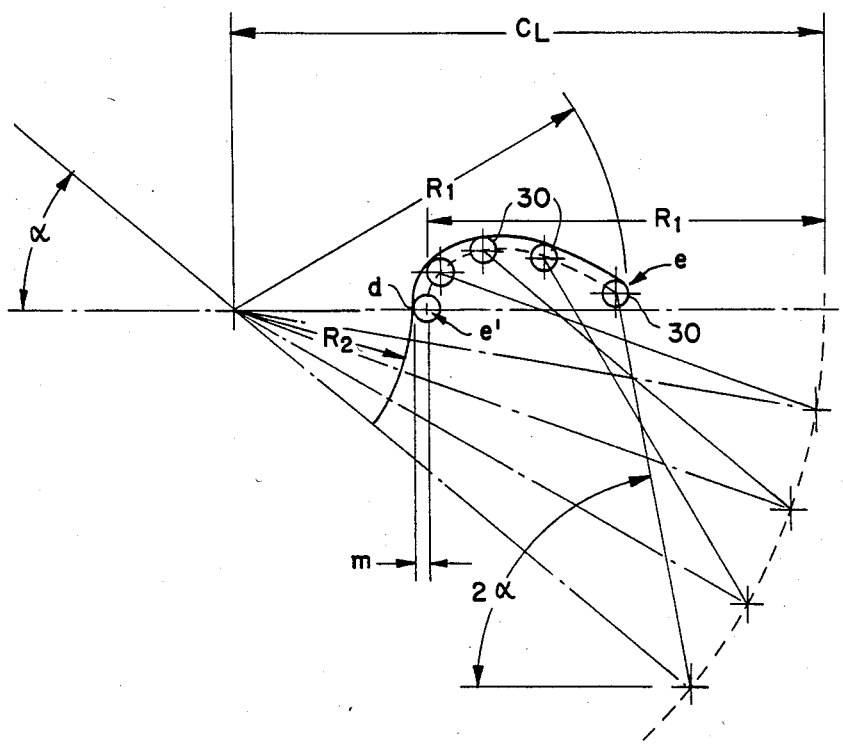

The rotor geometry is best described by referring to FIGS. 3-4D. In the embodiment shown in FIG. 3, the rotors 22, 22' are congruent and rotate at equal rotational velocity in opposite directions as shown by the arrows. Three peripheral edges of the rotors are described, the other edges are defined by the symmetry of the rotors. More particularly, edge e-h is an arc of radius $R_1$ swung about the center of the rotor 22 and forms a broad tip or lobe. Edge a-d is an arc of radius $R_2$ swung about the center of the rotor and forms the hub of the rotor. $R_1$ is greater than $R_2$. The relation between the above mentioned radii, the clearance (denoted m) and the fixed distance between the centers of the rotors (denoted $C_L$) is:

$$C_L = R_1 + R_2 + m$$

As the rotors counter-rotate, an edge of radius $R_1$ on a given rotor will approach an edge of radius $R_2$ on the opposite rotor until said edges are separated by distance m (the clearance). Throughout a portion of the rotational cycle, the separation (m) between these edges will remain constant.

Edge d–e has an innermost point at distance $R_2$ from the center of the rotor 22 and an outermost point at distance $R_1$ from the center of the rotor. Edge d–e is so constructed that, as the rotors counter-rotate, a point (denoted e') on the opposing rotor 22' will approach edge d–e until said point and edge are separated by a distance m and this separation (of the point e' and the edge d–e) will remain constant throughout a portion of the rotational cycle. Referring now to FIGS. 4A–4D, edge d–e is constructed as follows. Two rotors 22, 22' are mounted on centers a fixed distance apart (FIG. 4A). In FIG. 4B, each rotor has been rotated an equal amount α in opposite directions. In FIG. 4C the left hand rotor 22 is held stationary. The center of the right hand rotor 22' is rotated a given amount about the center of the left hand rotor. The right hand rotor is rotated twice said given amount about its center, in a rotational direction opposite to the direction in which the right hand rotor center was rotated. Note that the relative position of the rotors in FIG. 4C is identical to their relative position in FIG. 4B. By employing this convention, one may define the path of point(s) on one rotor relative to the opposing rotor, with said opposing rotor held stationary so that the path of the point(s) may be defined relative to a fixed frame of reference. This method is used to establish the geometry of edge d–e (FIG. 4D). Point e' (on the right hand rotor 22') is comparable to point e on the left hand rotor 22. The path of e', relative to the left hand rotor, is plotted. Circles 30 of radius m (the clearance) are drawn centered about points on the path of e'. Edge d–e is a curve which envelopes (i.e., is tangent to) said circles. The path of e' relative to the opposing rotor 22 is known as a prolate epicycloid. It should be noted that while edge d–e is described as a curve tangent to constant diameter circles 30 drawn about points on the prolate epicycloid, two such curves can be constructed tangent to the circles 30. The curve most useful for this invention is the curve of least curvature as shown in FIG. 4D.

Figure 5A:
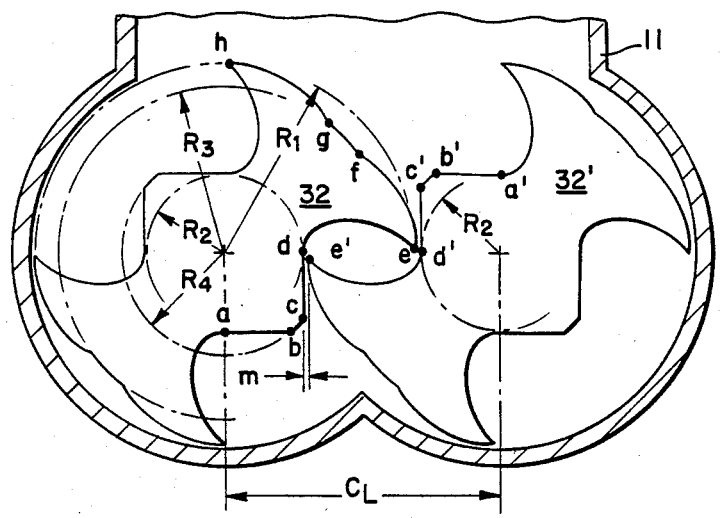
FIGS. 5A-5B represent a preferred embodiment of the rotors of this invention illustrating generation of a portion of their peripheral surfaces.

A preferred rotor embodiment is shown in FIG. 5A. As before the rotors 32 and 32' are congruent and rotate at equal rotational velocity in opposite directions. In these rotors the broad tips (e–h) are replaced with tips with a recessed outer surface. Recessing these tips reduces the viscous drag in the fluid between the tips and the housing bore. Consequently, less energy is imparted to the fluid being processed. A protuberance on the opposing rotor periodically removes fluid entrained in the recess. Edge e-H is replaced with edges e–f, f–g and g–h. Edge g–h is a mirror image of edge e–f. Edge a–d is replaced with edges a–b, b–c and c–d. Edge a–b is a mirror image of edge c–d. Edges not described are defined by symmetry. Edge f–g is an arc of radius $R_3$ swung about the center of the rotor. Edge b–c is an arc of radius $R_4$ swung about the center of the rotor. The relation between $R_3$ and $R_4$, the clearance (m) and the fixed distance between the centers of the rotors ($C_L$) is:

$$C_L = R_3 + R_4 + m.$$

Figure 5B:
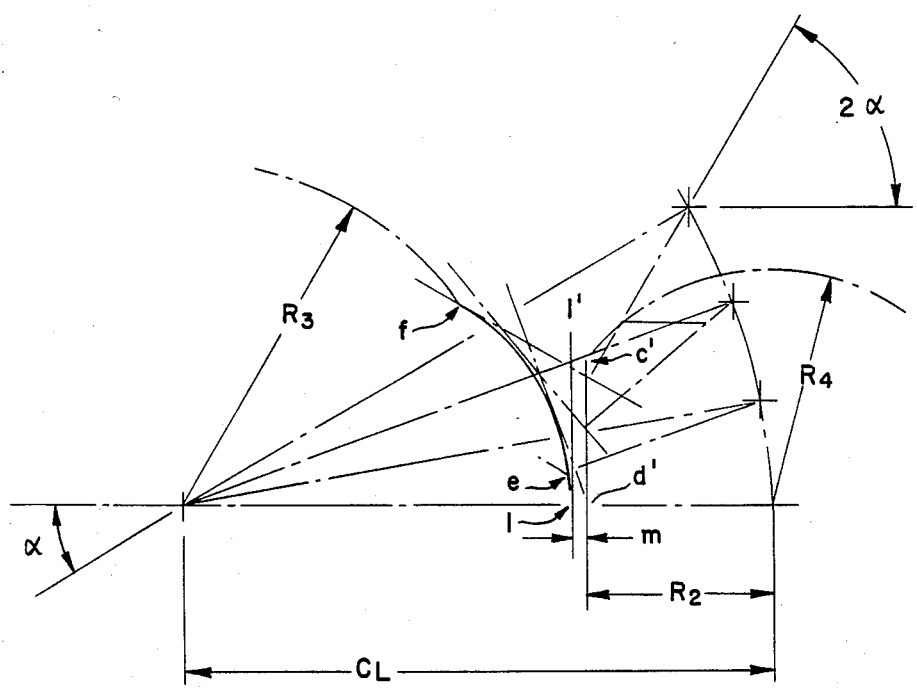

As the rotors counter-rotate, an edge of radius $R_4$ on a given rotor will approach an edge of radius $R_3$ on the opposing rotor until said edges are separated by distance m. Throughout a portion of the rotational cycle, the separation (m) between the edges will remain constant. Edge c–d is a straight line. Edge e–f has an innermost point at distance $R_3$ from the center of the rotor and an outermost point at distance $R_1$ from the center of the rotor. Edge e–f is so constructed that, as the rotors counter-rotate, a straight edge (denoted c'–d') on the opposing rotor will approach e–f until said straight edge and edge e–f are separated by a distance m and this separation will remain constant throughout a portion of the rotational cycle. Referring now to FIG. 5B, edge e–f is constructed as follows. The method in which one rotor is held stationary (FIGS. 4A–4C) is employed. Edge c'–d' (on the right hand rotor 32') is comparable to edge c–d on the left hand rotor 32. A straight line (1–1') is constructed parallel to edge c'–d' at distance m from c'–d'. Progressive positions of 1–1' (relative to the left hand rotor 32) are plotted. Edge e–f is the curve which is tangent to 1–1' when 1–1' is plotted in its successive positions.

Figure 6A:
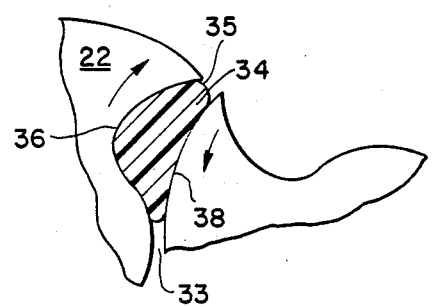
FIGS. 6A-6D are schematic illustrations showing progressive film forming and then trapping the film in a newly formed open-ended chamber during rotation of the rotors.
Figure 6C:
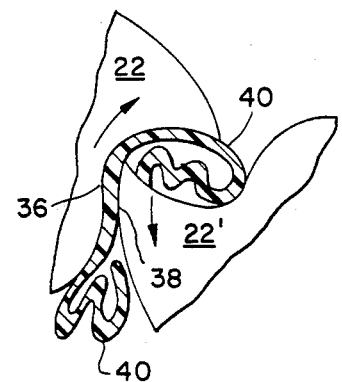
Figure 6B:
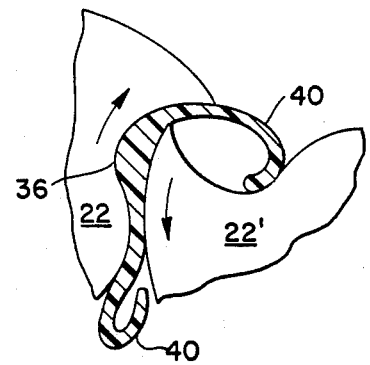
Figure 6D:
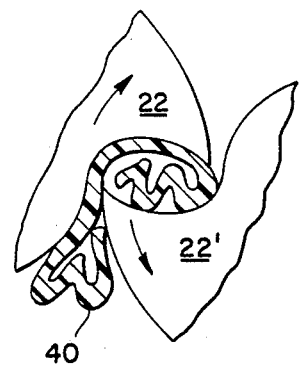

The operation of the counter-rotating intermeshed rotors 22, 22' of this invention may be more fully understood by referring to FIGS. 2B and 6A–6D. In FIG. 6A the rotors as previously described are so configured that clearances of fixed value exist between the closest points of the respective rotors and they trap polymer 34 in an open-ended chamber defined by rotor surfaces 36, 38. The above-mentioned clearances constitute the open ends (33, 35) of the chamber. As rotation proceeds (FIGS. 6B, 6C, and 6D), the volume of the chamber diminishes so that trapped polymer is forcibly expelled from the passages through the open ends 33, 35 as a film 40 (FIG. 6B). As rotation continues the film is trapped in newly formed chambers where the filmed polymer is recombined (FIGS. 6C and 6D).

As described with reference to FIG. 2B the rotors are sequentially arranged about common center lines of rotation so that they each have a different angular orientation relative to their centerlines of rotation to form a sawtooth stepped helix. As a consequence the polymer trapped in a chamber formed by the rotors may leave the chamber in several ways; either through the open ends 33, 35 or into passages formed by the conjugate action of longitudinally adjacent rotors. Because the orientation of the adjacent rotors differs, the polymer will flow preferentially in one longitudinal axial direction while the films 40 are formed and recombined.

While the invention has been described as advantageous for processing very viscous (nonflowable) polymers, it may also be used advantageously for processing flowable (pourable) viscous polycondensates.

I claim:

1. In an apparatus for processing fluid material that includes a housing having a plurality of cylindrical bores and a rotor in each of said bores intermeshed with each other, said rotors being counter-rotating at equal rotational speeds, the improvement of which comprises: each of said rotors having a peripheral surface configuration of radial curved portions followed by curves tangent to circles of constant diameter centered about points located on a prolate epicycloid, the radial portions of one rotor coacting with the prolate epicycloid related curved portion of the other rotor during rotation, to provide a constant clearance between the closest point of the rotors to each other and to form an open-ended chamber which diminishes in volume as rotation proceeds so that material in said chamber is expelled through said ends of said chamber as a film.

2. The apparatus as defined in claim 1, there being a plurality of rotors in each of said bores, adjacent rotors on each longitudinal rotational axis in said bores being arranged in a sawtooth stepped helix so that material is conveyed in a longitudinal direction as it is expelled through said ends as a film.

3. The apparatus as defined in claims 1 or 2, each of said rotors having a lobe and a hub, said lobe extending outwardly toward the surface of the bore, said lobe having a recessed outer surface, said hub having a protrusion, said protrusion intermeshing with the recessed outer surface of an axially adjacent rotor during a portion of the rotation of said rotors.

* * * * *